Oct. 11, 1932.

F. A. KRUSEMARK

PNEUMATIC TIRE

Re. 18,618

Original Filed April 3, 1926

INVENTOR

F. A. Krusemark.

BY Albert E. Dietrich

ATTORNEY

Reissued Oct. 11, 1932

Re. 18,618

UNITED STATES PATENT OFFICE

FREDERICK A. KRUSEMARK, OF CHICAGO, ILLINOIS, ASSIGNOR, BY MESNE ASSIGNMENTS, TO THE LAMBERT TIRE AND RUBBER COMPANY, A CORPORATION OF OHIO

PNEUMATIC TIRE

Original No. 1,594,102, dated July 27, 1926, Serial No. 99,516, filed April 3, 1926. Application for reissue filed December 18, 1931. Serial No. 581,982.

My invention has for its object to provide certain new and useful improvements in puncture-resisting pneumatic tires of the kind wherein the tread is of greater thickness than standard practice and is provided with transverse openings (recesses, or holes extending partly or entirely through the tire from side to side), and it especially has for its object to provide such a tire with alternate notches or recesses and lugs at the sides of the tread, the recesses aligning with the transverse openings and of a greater area than the diameter of the openings, thereby leaving a series of lugs between adjacent openings whose purpose is to guard the entrances to the openings and prevent or reduce cracking of the rubber at the entrances of the openings as well as to serve as traction lugs when the tire is running over soft ground, such as sand or mud.

More subordinately the invention resides in those novel features of construction, combination and arrangement of parts, all of which will be first fully described, then be specifically pointed out in the appended claim, reference being had to the accompanying drawing, in which:—

Figure 1:
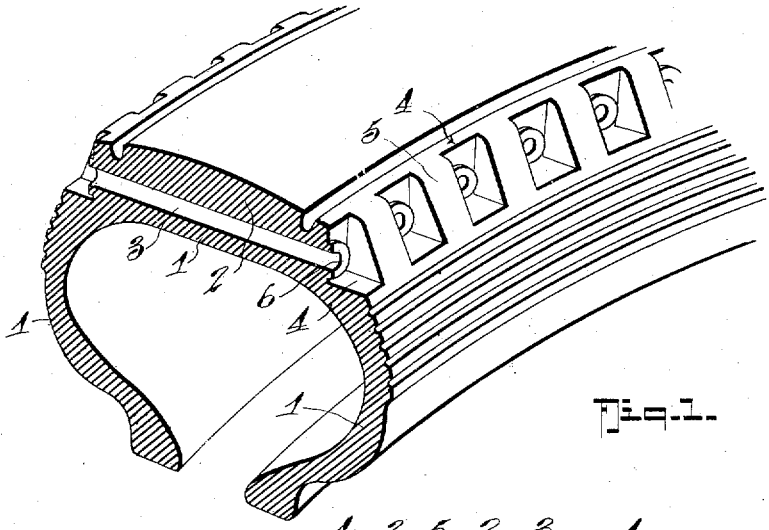
Fig. 1 is a sectional perspective view of a portion of a tire showing one embodiment of my invention (the openings in this embodiment passing through from side to side)
Figure 2:
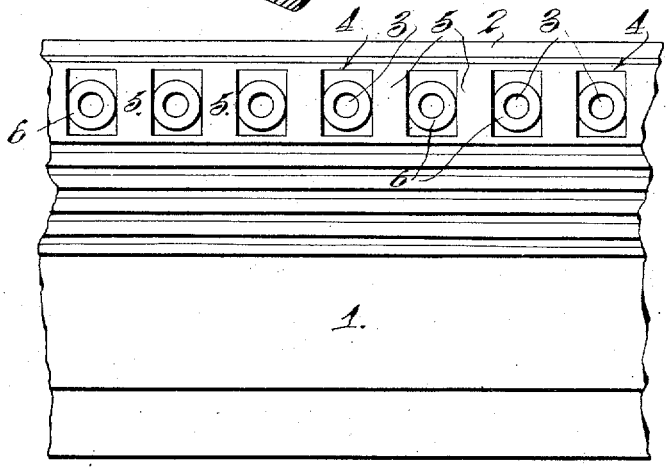
Fig. 2 is a side elevation of the structure shown in Fig. 1.

In the drawing in which like numerals of reference indicate like parts in all the figures, 1 represents the carcass of the tire which may be built up in accordance with the usual practice, and 2 indicates the tread which in the present instance is built thicker than standard practice and is provided with openings 3 (or $3^a$ in Figure 3) which serve not only to increase the resiliency of the tread portion of the tire but principally to ventilate the tread rubber and prevent its overheating with consequent disintegration.

4 designates notches or recesses formed in the tread portion of the tire in alignment with the various openings. These recesses or notches are of greater area in elevation than the diameter of the openings whereby lugs 5 are left between adjacent openings, these lugs serving the two-fold purpose of protecting the tire carcass at the mouth of the openings, and as traction lugs when the tire is rolling on a soft road bed as for instance in sand or mud.

Figure 3:
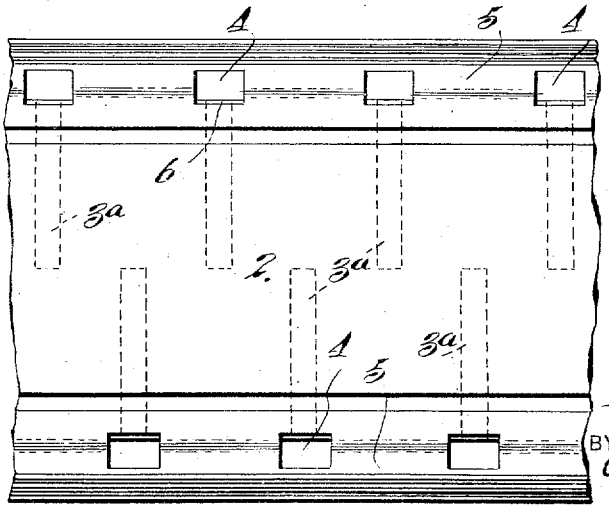
Fig. 3 is a plan view of another embodiment of the invention (in this embodiment the openings passing but partly through the tread and being staggered).

It should, of course, be understood that the openings 3 may extend entirely through the tread from side to side (and this is a preferred embodiment) or they may be blind openings extending but partly into the tire tread as indicated at $3^a$ in Figure 3, and if desired the openings at one side may be staggered with relation to those at the other side as indicated in Figure 3.

In my present invention I do not desire to be understood as limited to any particular depth of openings 3, the essential feature of the present invention being the provision of the notches or recesses 4 and the intermediate lugs 5, the notches or recesses being arranged to align up with the openings, or in other words, the openings beginning at the inner side of the recesses or notches.

If desired the mouths of the openings may further be reinforced by circular beads 6 formed on the inner vertical wall of the recesses or notches.

From the foregoing description, taken in connection with the accompanying drawing, it is thought the construction, operation and advantages of my invention will be clear to those skilled in the art to which it relates.

Having thus described my invention, what I claim is:

A pneumatic tire having a thickened tread provided with transverse openings from the sides of the tread and having alternately disposed notches and lugs, the openings extending inwardly from the notches, and ring-like beads surrounding the openings within the notches.

In testimony whereof I have hereunto subscribed my name this 7th day of December, 1931.

FREDERICK A. KRUSEMARK.